(12) United States Patent
Kuramatsu (10) Patent No.: US 7,242,969 B2
(45) Date of Patent: Jul. 10, 2007

(54) PORTABLE COMMUNICATION TERMINAL AND RINGTONE VOLUME CONTROL METHOD

(75) Inventor: Hiroyasu Kuramatsu, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 11/189,976

(22) Filed: Jul. 27, 2005

(65) Prior Publication Data

US 2006/0025120 A1    Feb. 2, 2006

(30) Foreign Application Priority Data

Jul. 28, 2004  (JP) .............................. 2004-220866

(51) Int. Cl.
*H04B 1/38* (2006.01)

(52) U.S. Cl. .................................. 455/567; 455/456.4

(58) Field of Classification Search ................ 455/418, 455/557, 567, 575.3, 575.1, 573, 572, 456.4

See application file for complete search history.

(56) References Cited

U.S. PATENT DOCUMENTS

2003/0013496 A1* 1/2003 Kim et al. .................. 455/567
2004/0203481 A1* 10/2004 Park et al. .................. 455/74.1
2004/0253992 A1* 12/2004 Huang ........................ 455/567
2005/0048945 A1* 3/2005 Porter ....................... 455/404.1
2005/0239446 A1* 10/2005 Tagawa et al. .......... 455/414.1

FOREIGN PATENT DOCUMENTS

| JP | 8-307488 | 11/1996 |
| JP | 2001-506458 | 5/2001 |
| JP | 2003-143692 | 5/2003 |

\* cited by examiner

*Primary Examiner*—Nick Corsaro
*Assistant Examiner*—Shannon R Brooks
(74) *Attorney, Agent, or Firm*—Whitham Curtis Christofferson & Cook, PC (57) ABSTRACT

A portable communication terminal has two chassis and one of the two chassis includes a receiver for outputting voice and a speaker for informing of an incoming call. The terminal includes a detection section for detecting whether the two chassis are overlapped or not and a control section for controlling an operation of the portable communication terminal. A ringtone volume control unit of the control section controls the volume level of the ringtone according to a detection result of the detection section. The terminal can include an operation detection unit for detecting an operation of the receiver and a device detection unit for detecting whether or not the portable communication terminal is connected to another device.

8 Claims, 9 Drawing Sheets

PORTABLE COMMUNICATION TERMINAL AND RINGTONE VOLUME CONTROL METHOD

BACKGROUND OF THE INVENTION

1. Field of the Invention

The present invention relates to a portable communication terminal such as a portable telephone set and a personal handyphone system (PHS), and more particularly to a portable communication terminal having a speaker for outputting voice on the phone (hereinafter, referred to as a receiver) and a speaker for outputting a ringtone.

2. Description of the Related Art

In recent years, many portable telephone sets have a camera function and can connect to the Internet. For these reasons, the portable telephone sets are desired to have a large display screen. Folding portable telephone sets and slide-type portable telephone sets can relatively easily have a large display screen arranged therein. In order to arrange a large display screen in a portable telephone set, other components are required to be downsized and the arrangement of the components is restricted. For example, JP 2003-143692 A discloses a portable telephone set in which a receiver and a speaker for outputting a ringtone are integrated. However, in a case where the portable telephone set is capable of informing of an incoming call while the user is on the phone, a loud ringtone is suddenly output to the user's ear.

JP2001-506458A discloses a portable telephone set capable of controlling a ringtone. The portable telephone set includes a speaker which has both functions of outputting a ringtone and outputting voice on the phone, and includes a flip arranged at a front side of the speaker. The portable telephone set suppresses the volume of the speaker to a level suitable for speech on the phone when the flip is opened. JP 08-307488 A discloses a folding portable telephone set having two chassis. The portable telephone set detects an opening operation of the two chassis and suspends or reduces a ringtone.

However, there are cases where the user of a portable telephone set desires to know the presence or absence of an incoming call to the portable telephone set even when the flip is opened or the two chassis are opened. The portable telephone sets disclosed in the known examples mentioned above cannot meet such a user's need.

SUMMARY OF THE INVENTION

A portable communication terminal of the present invention has two chassis. The terminal includes: a receiver that is arranged in one of the two chassis and outputs voice; and a speaker for informing of an incoming call that is arranged in the one of the two chassis. Also, the terminal includes a detection section that detects whether or not the two chassis are overlapped; and a control section that controls an operation of the portable communication terminal. The control section includes ringtone volume control means for controlling the volume of a ringtone according to a detection result of the detection section. The portable communication terminal may further include: receiver-operation detection means for detecting an operation of the receiver; and device detection means for detecting whether or not the portable communication terminal is connected to another device.

A method of controlling a ringtone of a portable communication terminal of the present invention includes the following steps:

(a) detecting an incoming call to the portable communication terminal;

(b) detecting, when an incoming call is detected, whether the two chassis are overlapped or not;

(c) outputting, when the two chassis are overlapped, the ringtone at a preset volume level;

(d) detecting, when the two chassis are not overlapped, whether the preset volume level of the ringtone is higher than a predetermined threshold value or not;

(e) setting, when the preset volume level of the ringtone is higher than the predetermined threshold value, the volume level of the ringtone to be output lower than the predetermined threshold value; and (f) outputting, when the preset volume level of the ringtone is equal to or lower than the predetermined threshold value, the ringtone at the preset volume level.

According to the present invention, a loud ringtone is not output to the user's ear while the user is on the phone. The portable communication terminal can output a ringtone according to a user's need even when the user is performing an operation other than a call.

BRIEF DESCRIPTION OF THE DRAWINGS

The above and other objects, features and advantages of the present invention will become apparent form the following detailed description when taken with the accompanying drawings in which.

DETAILED DESCRIPTION OF THE PREFERRED EMBODIMENTS

Figure 1:
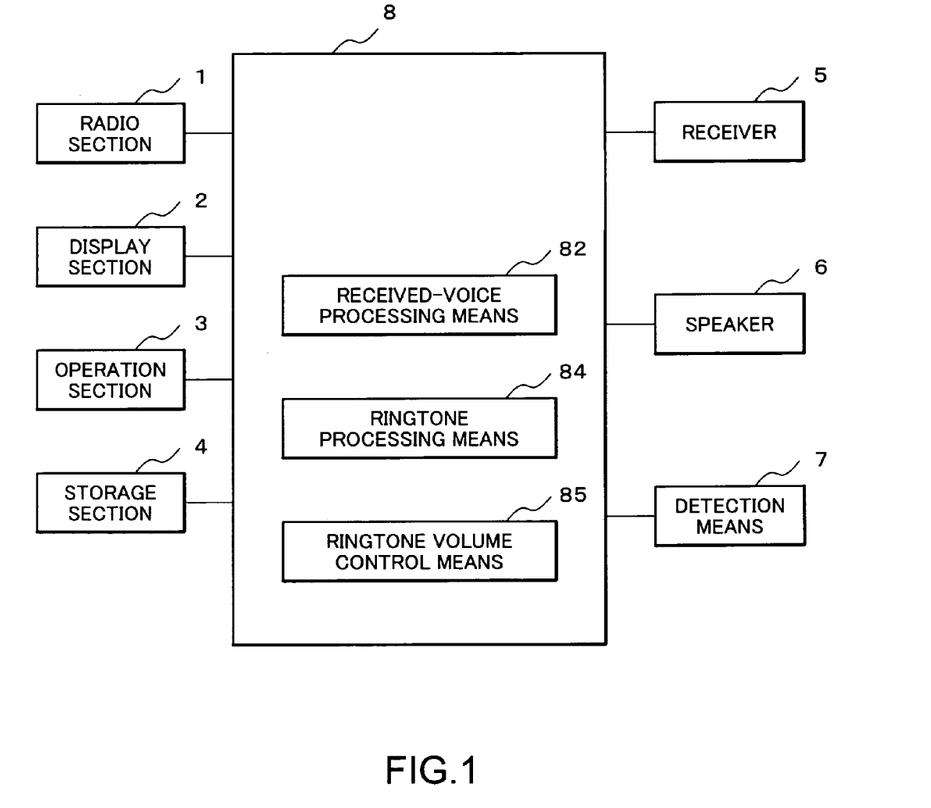
FIG. 1 is a block diagram of a folding portable telephone set as an example of a portable communication terminal according to the present invention.

A folding portable telephone set as a preferred example of a portable communication terminal according to the present invention will be described hereinafter. Referring to FIG. 1, the folding portable telephone set includes a radio section 1, a display section 2, an operation section 3 having a keypad, and a storage section 4 for storing various pieces of software, various pieces of data including data concerning a ringtone, voice on the phone, and the like. Further, the portable telephone set includes a receiver 5 for outputting voice on the phone or stored voice, a speaker 6 for out putting a ringtone, and detection means 7 for detecting whether the chassis of the portable telephone set are opened or not. The detection means 7 can include a switch, a magnetic sensor, or an optical sensor. The portable telephone set further includes a control section 8 which has received-voice processing means 82, ringtone processing means 84, and ringtone volume control means 85. The received-voice processing means 82 converts a received voice signal into an analog signal, amplifies the analog signal, and outputs it from the receiver 5. The ringtone processing means 84 reads data of a ringtone from the storage section 4 when an incoming call is detected, and amplifies and outputs it from the speaker 6. The ringtone volume control means 85 sets the volume of a ringtone according to a detection result of the detection means 7 when an incoming call is detected.

The user can set the volume of a ringtone of the portable telephone set. The user can display a predetermined screen on the display section 2, use the operation section 3, and set the ringtone at a desired volume level. The ringtone processing means 84 stops sending a ringtone signal to the speaker 6 when the user answers an incoming call or stops the ringtone. The user or the manufacturer of the portable telephone set can store in advance in the storage section 4, the maximum volume value which can be accepted by the user when the ringtone is output from the speaker 6 close to the user's ear (that is, maximum acceptable volume). The maximum acceptable volume may be, as a sound pressure level (PSL) of the speaker 6, 120 dB SPL, for example, such that the auditory function of the user is protected and the user does not feel unpleasant. The user can set another ringtone volume value which is lower than the maximum acceptable volume in the storage section 4. The ringtone at the above lower volume may be selected according to an operation state of the portable telephone set, such as during a call or during playback of stored voice.

Figure 2A:
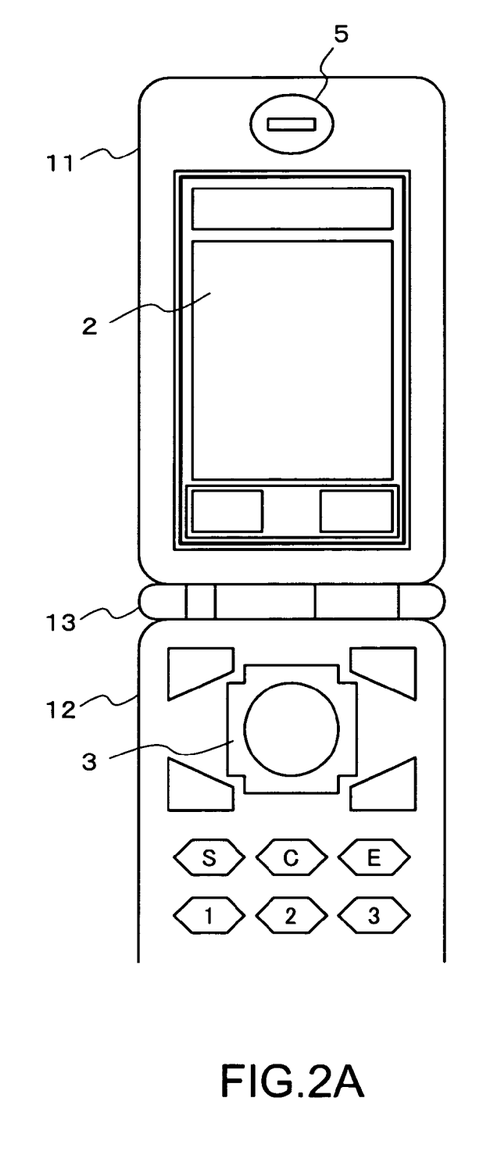
FIGS. 2A and 2B, respectively show a front face and a rear face of an example of the folding portable telephone set.
Figure 2B:
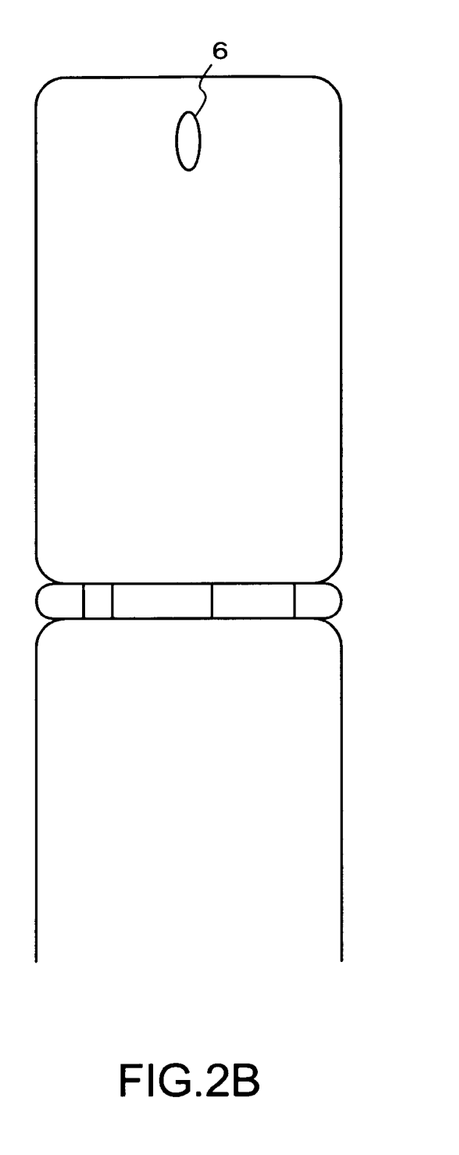

FIGS. 2A and 2B respectively show a front face and a rear face of the example of the folding portable telephone set. The folding portable telephone set includes a first chassis 11 and a second chassis 12 which are rotatably connected by a hinge section 13. In FIGS. 2A and 2B, the two chassis are opened. The display section 2 and the receiver 5 are arranged on a front face side of the first chassis 11, and the keypad of the operation section 3 is arranged on a front face side of the second chassis 12. The speaker 6 is arranged on a rear face side of the first chassis 11.

Figure 3:
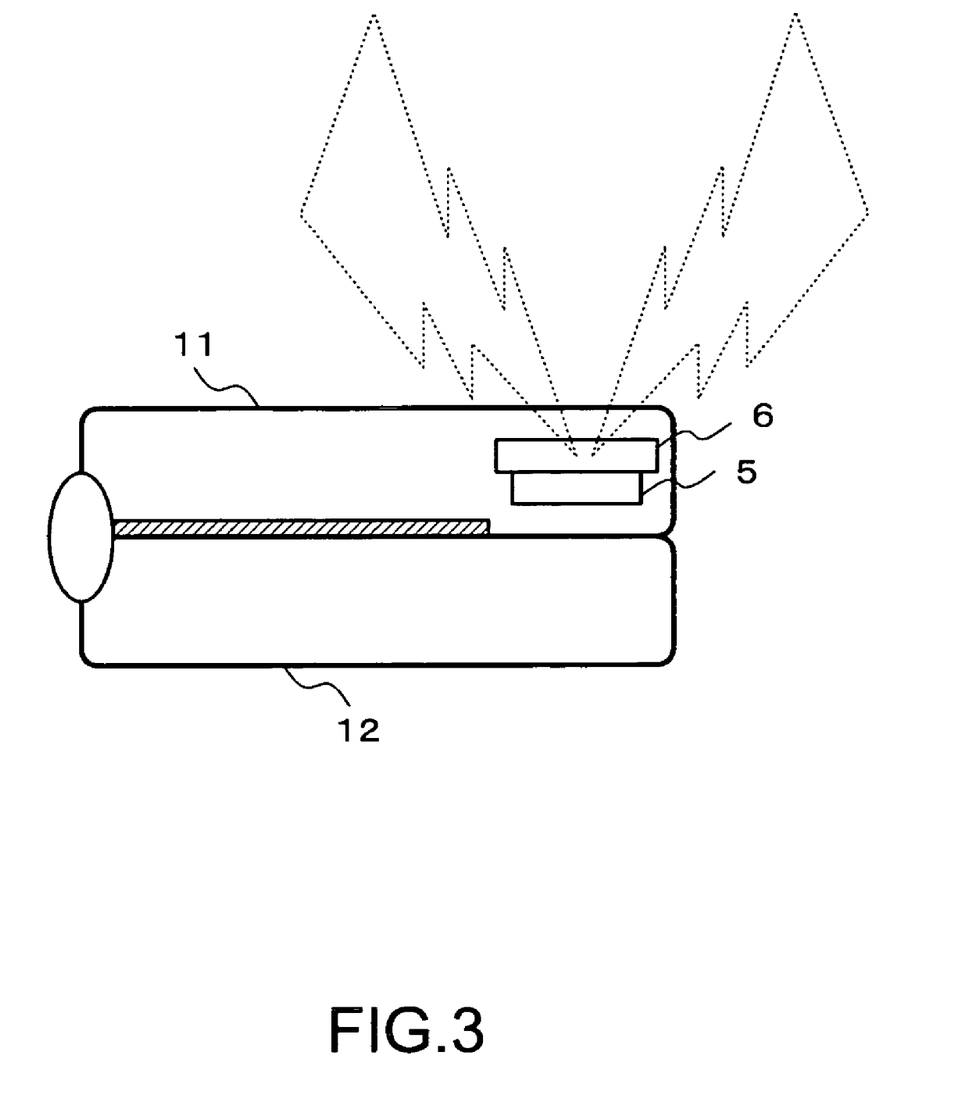
FIG. 3 shows an example state of the folding portable telephone set where two chassis are folded.

FIG. 3 shows an example of the folding portable telephone set where the two chassis 11 and 12 are folded. The receiver 5 and the speaker 6 are adjacent and arranged in opposite directions from each other.

Figure 4:
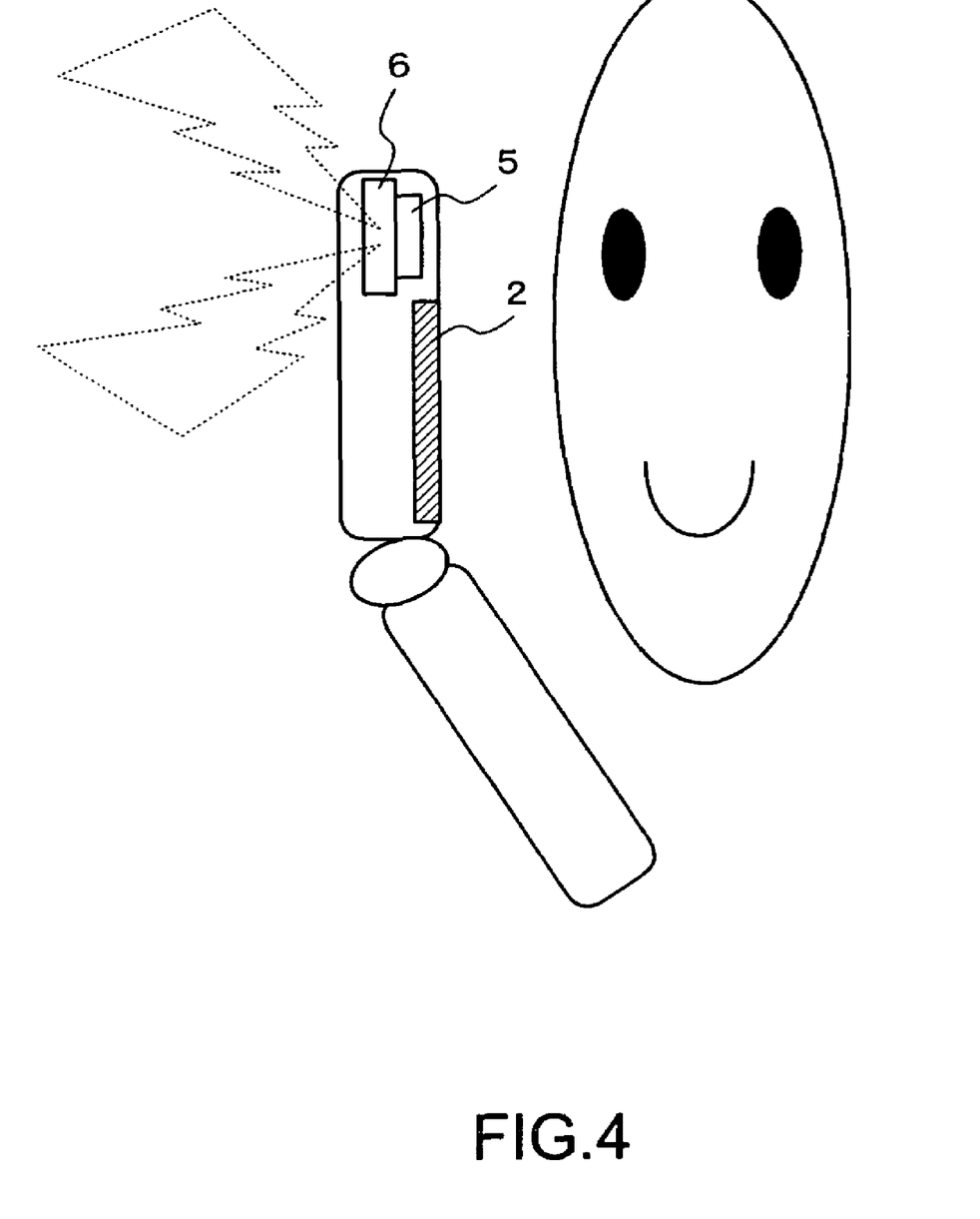
FIG. 4 shows a user on the phone using the folding portable telephone set.

Referring to FIG. 4, when the user of the portable telephone set is on the phone with the receiver 5 close to the ear, the ringtone may be output from the speaker 6. The user feels such a sudden, loud ringtone to be unpleasant, and in some cases there is a possibility that the auditory function of the user may be adversely affected.

Figure 5:
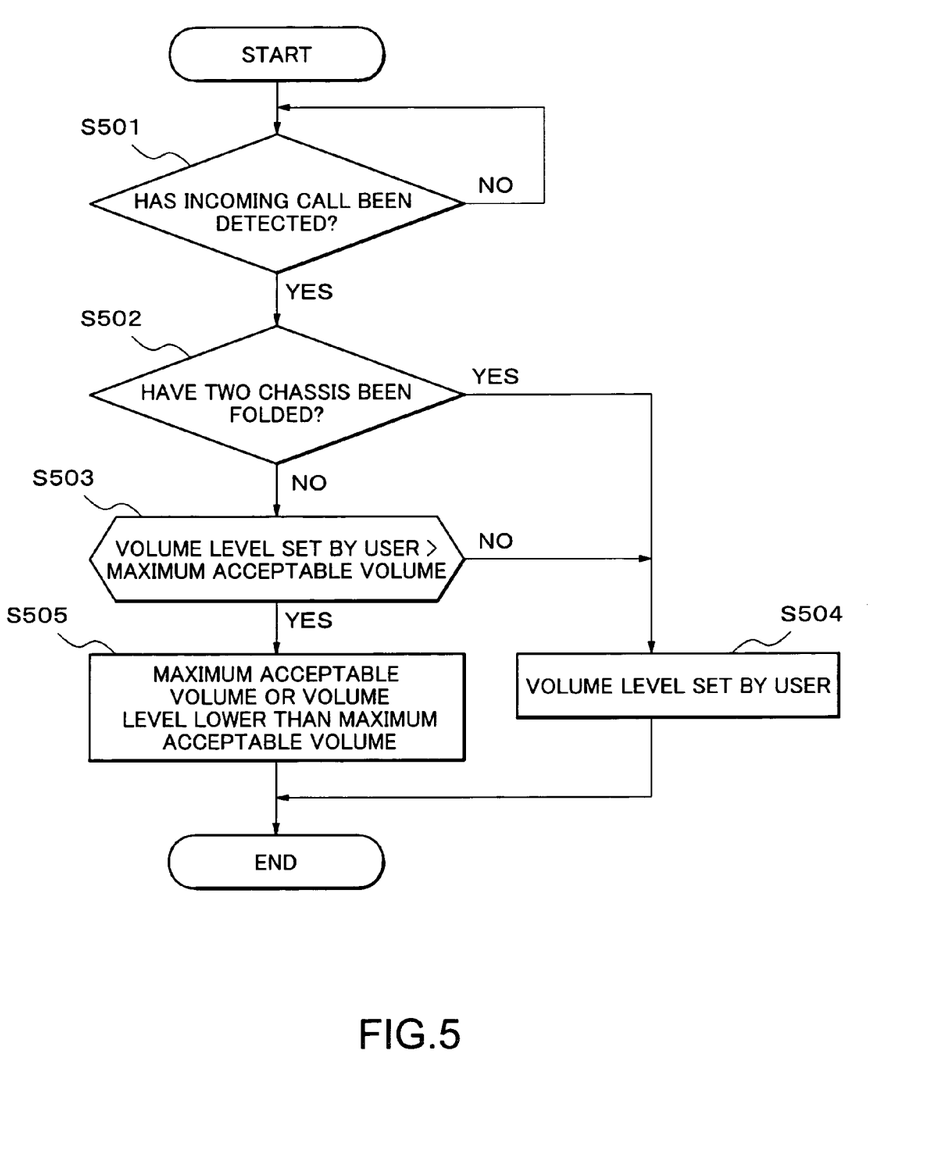
FIG. 5 shows an operation example of the folding portable telephone set as an example of the portable communication terminal according to the present invention.

FIG. 5 shows an operation example of the portable telephone set illustrated in FIG. 1 when it detects an incoming call. Specifically, an operation example in which the ringtone volume control means 85 of the control section 8 controls the ringtone is shown. When the portable telephone set detects an incoming call (YES in S501), the detection means 7 detects whether the chassis of the portable telephone set are folded or not (S502). When the chassis are folded (YES in S502), the ringtone volume control means 85 outputs the ringtone from the speaker 6 at a volume level set by the user (S504). When the chassis are opened (NO in S502), the ringtone volume control means 85 compares the volume level of the ringtone set by the user and the above-described maximum acceptable volume set in advance (S503). If the volume level set by the user is equal to or lower than the maximum acceptable volume (NO in S503), the ringtone volume control means 85 outputs the ringtone from the speaker 6 at the volume level set by the user (S504). If the volume level set by the user is higher than the maximum acceptable volume (YES in S503), the ringtone volume control means 85 sets the ringtone to be output from the speaker 6 at the level of the maximum acceptable volume or at the predetermined volume level lower than the maximum acceptance volume (S505). The use can set the predetermined volume level lower than the maximum acceptance volume. Further, the user can select the maximum acceptable volume or the predetermined appropriate volume level according to an operation of the portable telephone set.

The user of the portable telephone set does not feel unpleasant nor receive an adverse effect on his/her auditory function even when the ringtone is output during a call or during playback of stored voice.

Figure 6:
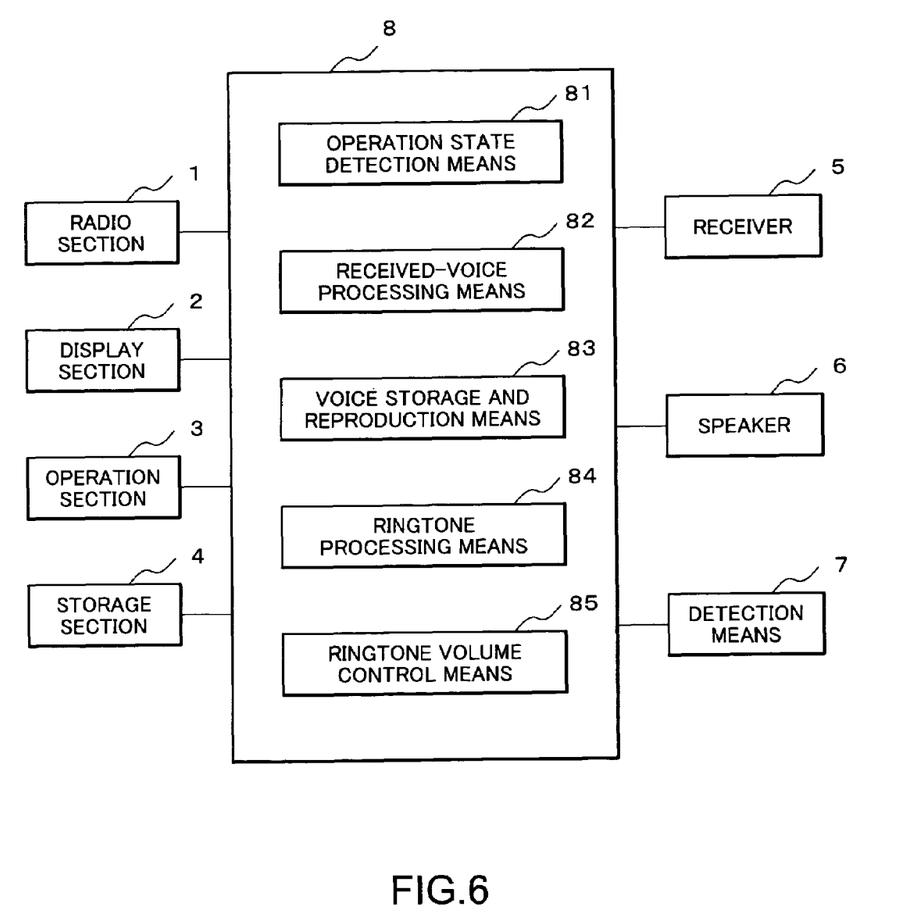
FIG. 6 is a block diagram of another example of a folding portable telephone set as an example of the portable communication terminal according to the present invention.

FIG. 6 shows another example of a folding portable telephone set. The control section 8 of the portable telephone set includes operation state detection means 81 and voice storage and playback means 83 in addition to the means shown in FIG. 1. The other components of the portable telephone set shown in FIG. 6 are the same as those of the portable telephone set shown in FIG. 1. The voice storage and playback means 83 stores voice during a call in the storage section 4 and plays back the voice by an operation performed by the user. Usually, voice to be played back is output from the receiver 5 at a volume level similar to that of the usual voice on the phone. The operation state detection means 81 detects whether or not the portable telephone set is being used for a call and whether or not the portable telephone set is playing back stored voice. In other words, the operation state detection means 81 detects whether or not voice is being output from the receiver 5. Mobile communication providers can provide a service in which a portable telephone set outputs a ringtone even when the user is on the phone. The ringtone volume control means 85 controls the volume of the ringtone of a portable telephone set which receives such a service, based on a detection result of the detection means 7 and the operation state detection means 81. For the volume of the ringtone, the above-described maximum acceptable volume or the predetermined volume lower than the maximum acceptable volume can be selected.

Figure 7:
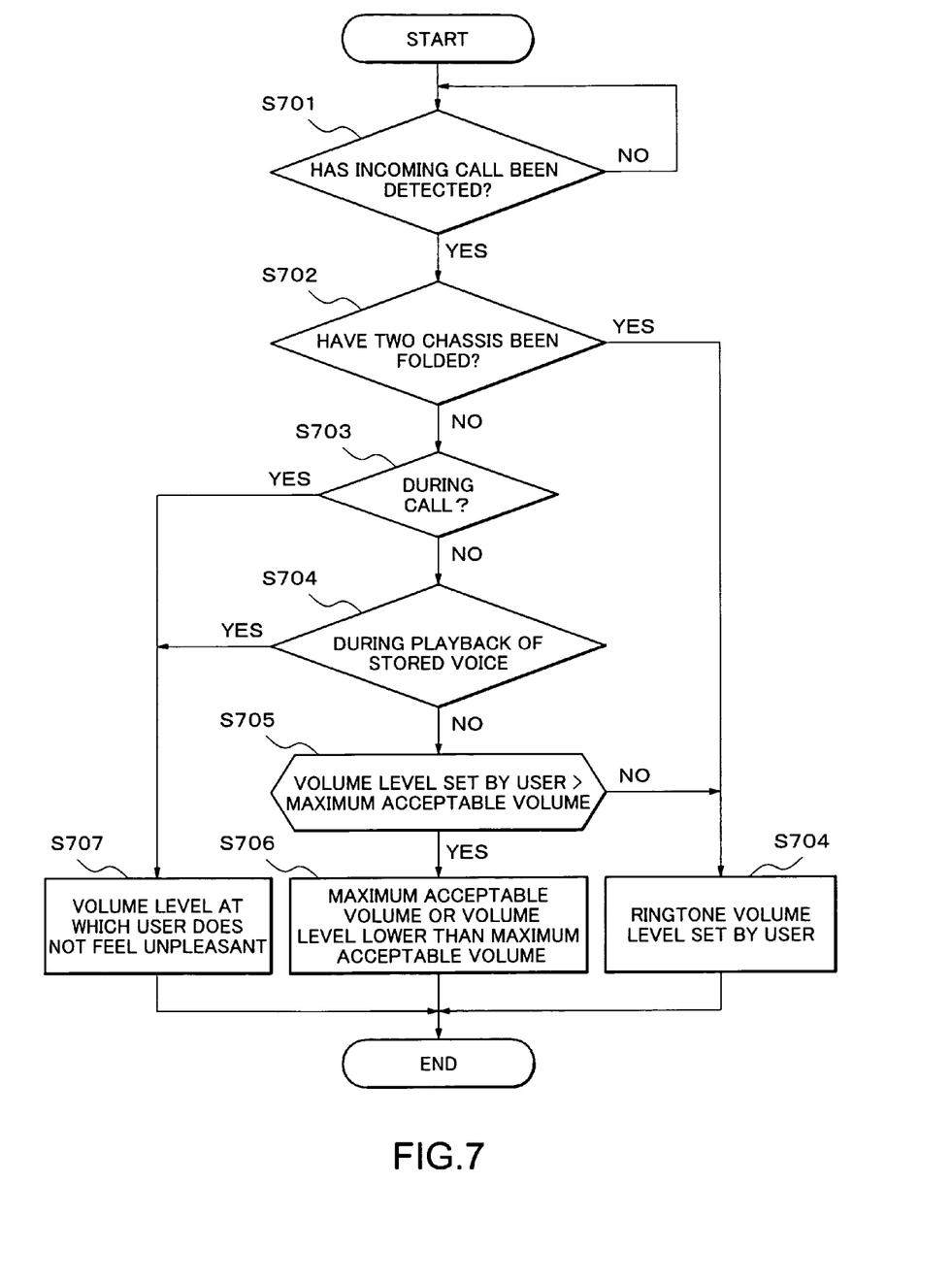
FIG. 7 shows an operation example of the folding portable telephone set illustrated in FIG. 6.

FIG. 7 shows an operation example of the folding portable telephone set illustrated in FIG. 6 when it detects an incoming call. When the portable telephone set detects an incoming call (YES in S701), the detection means 7 detects whether the chassis of the portable telephone set are folded or not (S702). When the chassis are folded (YES in S702), the ringtone volume control means 85 outputs the ringtone from the speaker 6 at a volume level set by the user (S704). When the chassis are opened (NO in S702), the operation state detection means 81 detects whether or not the portable telephone set is being used for a call (S703), and then detects whether or not stored voice is being played back (S704). When the portable telephone set is being used for a call (YES in S703) or when the portable telephone set is playing back stored voice (YES in S704), the ringtone volume control means 85 outputs the ringtone from the speaker 6 (S707). At this time, any volume level of the ringtone can be selected within a volume range where the user does not feel unpleasant even when the receiver 5 is close to the user's ear. Alternatively, the predetermined volume level lower than the maximum acceptable volume described above can be selected. When the portable telephone set is not being used for a call (NO in S703) and when the portable telephone set is not playing back stored voice (NO in S704), the ringtone volume control means 85 compares the volume level of the ringtone set by the user and the above-described maximum acceptable volume set in advance (S705). If the volume level set by the user is equal to or lower than the maximum acceptable volume (NO in S705), the ringtone volume control means 85 outputs the ringtone from the speaker 6 at the volume level set by the user (S704). If the volume level of the ringtone set by the user is higher than the maximum acceptable volume (YES in S705), the ringtone volume control means 85 sets the ringtone to be output from the speaker 6 at the level of the maximum acceptable volume or at an appropriate volume level lower than the maximum acceptance volume (S706). The appropriate volume level can be set by the user. Further, the user can select either the maximum acceptable volume or the appropriate volume level.

Figure 8:
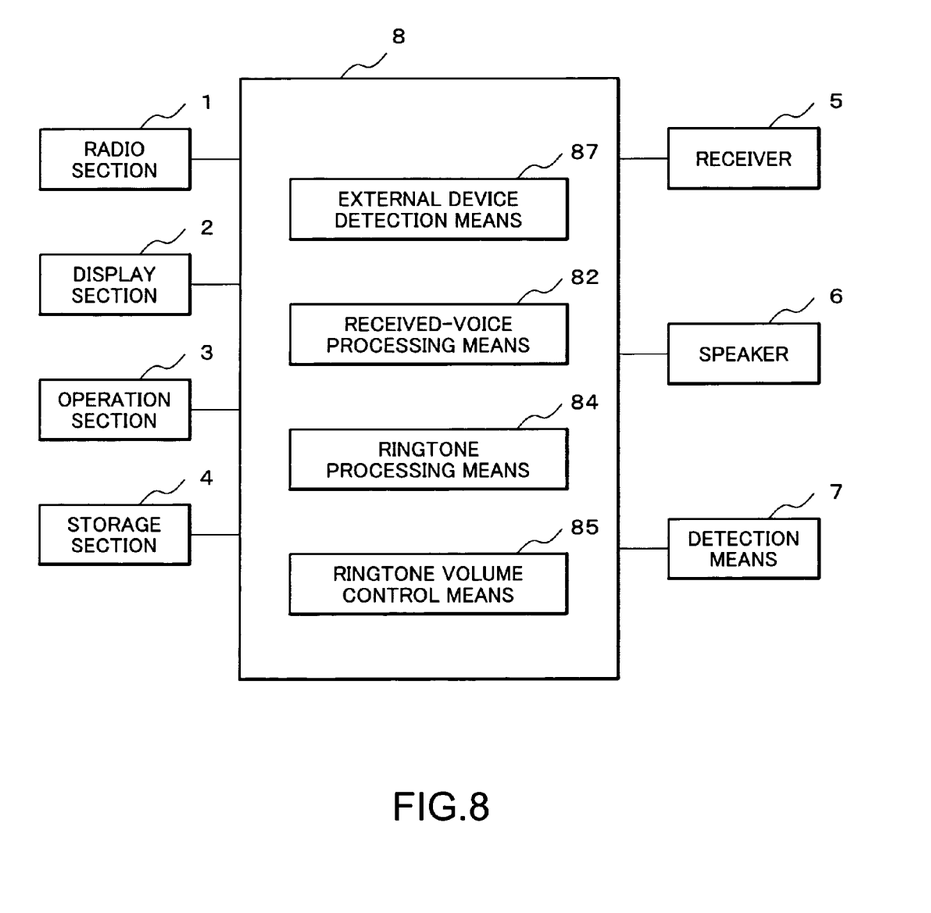
FIG. 8 is a block diagram of still another example of a folding portable telephone set as an example of the portable communication terminal according to the present invention.

FIG. 8 shows still another example of a folding portable telephone set. The control section 8 of the portable telephone set includes external device detection means 87. The other components of the portable telephone set are the same as those of the portable telephone set shown in FIG. 1. The external device detection means 87 detects whether or not a battery of the portable telephone set is connected to a battery charger. Further, the external device detection means 87 detects whether or not the portable telephone set is connected to a hands-free headset, a PC link cable, a data transfer device such as a Bluetooth device or an IrDA device, or the like.

Figure 9:
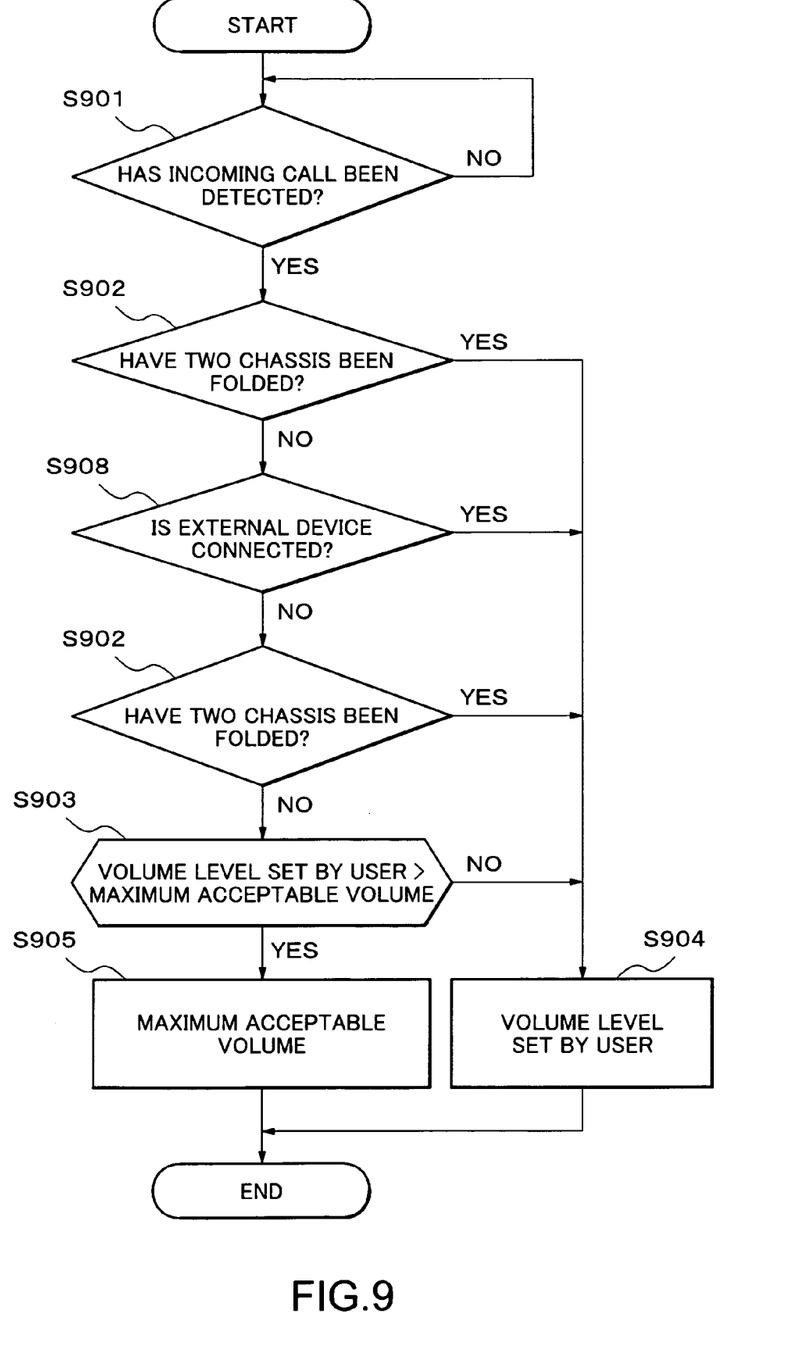
FIG. 9 shows an operation example of the folding portable telephone set illustrated in FIG. 8.

FIG. 9 shows an operation example of the folding portable telephone set illustrated in FIG. 8 when it detects an incoming call. When the portable telephone set detects an incoming call (YES in S901), the external device detection means 87 detects whether or not the portable telephone set is being charged (S906), and then detects whether or not the portable telephone set is connected to an external device (S908). When the portable telephone set is being charged (YES in S906) or when the portable telephone set is connected to an external device (YES in S908), the ringtone volume control means 85 outputs the ringtone from the speaker 6 at the volume level set by the user (S904). When the portable telephone set is not being charged (NO in S906) and when the portable telephone set is not connected to any external device (NO in S908), the ringtone volume control means 85 controls the volume of the ringtone. When the chassis of the portable telephone set are folded (YES in S902), the ringtone volume control means 85 outputs the ringtone from the speaker 6 at the volume level set by the user (S904). When the chassis of the portable telephone set are opened (NO in S902), the ringtone volume control means 85 performs the same operations in Steps S903, S905, and S904 as described in Steps S705, S706, and S704. However, in the operation example shown in FIG. 9, the user does not bring the portable telephone set close to his or her ear. Therefore, in Step S905, it is preferred that the ringtone to be output from the speaker 6 be at the level of the maximum acceptable volume. Alternatively, in Step S905, the ringtone can be output at the volume level set by the user.

The present invention can be applied to a PHS, a personal digital assistant (PDA), or the like. The above-described portable telephone sets control the volume level of the ringtone according to the use condition. Therefore, it is possible to reliably inform the user of an incoming call without annoying the user. The volume level of the ringtone can be controlled to be increased at every elapse of a predetermined time since its output.

While the present invention has been described in connection with certain preferred embodiments, it is to be understood that the subject matter encompassed by the present invention is not limited to those specific embodiments. On the contrary, it is intended to include all alternatives, modifications, and equivalents as can be included within the spirit and scope of the following claims.

Further, it is the inventor's intent to retain all equivalents of the claimed invention even if the claims are amended during prosecution.

What is claimed is:

1. A portable communication terminal comprising:
   two chassis, connected to one another and movable between an overlapped position and a non-overlapped position relative to one another;
   a receiver for outputting voice that is arranged in one of the two chassis;
   a speaker for informing of an incoming call that is arranged in the one of the two chassis, at a volume based on a ringtone volume signal;
   a detection section that detects whether or not the two chassis are in said overlapped position and generates a corresponding detection signal; and
   a control section having
      means for receiving and storing a first volume level,
      means for receiving and storing a second volume level,
      means for generating, in response to receiving said incoming call signal concurrent with said detection signal indicating said two chassis having said overlapped position, said ringtone volume signal based on said first volume level,
      means for generating, in response to receiving said incoming call signal concurrent with receiving said detection signal indicating said two chassis being in said non-overlapped position, said ringtone volume signal based on the lesser of said first volume level and said second volume level, said means for generating including means for comparing said first volume level with said second volume level, and wherein said generating is based, at least in part, on said comparing.

2. The portable communication terminal of claim 1, wherein the speaker for informing of an incoming call and the receiver are adjacent to each other.

3. The portable communication terminal of claim 1, wherein:
   the two chassis can be folded to face each other; and
   the detection section detects whether the two chassis are folded or not.

4. The portable communication terminal of claim 1, further comprising recording and playback means for recording voice during a call for playing back the voice.

5. The portable communication terminal of claim 1, further comprising device detection means for detecting whether or not the portable communication terminal is connected to another device,
   wherein, when the device detection means detects a connection of the portable communication terminal with another device, the ringtone volume control means outputs, in response to receiving an incoming call, the ringtone at the first volume level, regardless of the detection signal indicating said two chassis being in said non-overlapped position.

6. The portable communication terminal of claim 5, wherein the device detection means detects whether the portable communication terminal is being charged or not, and when the portable communication terminal is being charged, the ringtone volume control means outputs, in response to receiving an incoming call, the ringtone at the first volume level, regardless of the detection signal indicating said two chassis being in said non-overlapped position the ringtone at the stored volume level.

7. The portable communication terminal of claim 1, further including means for preventing said second volume value from being changed by a user.

8. The portable communication terminal of claim 1, further including a graphical user interface for adjusting said second volume level.

* * * * *